United States Patent
Parr

(10) Patent No.: US 7,651,624 B2
(45) Date of Patent: Jan. 26, 2010

(54) OIL/WATER SEPARATOR ONE TRUCK CLEANING WITH CLEAN WATER RETURN

(76) Inventor: B. Donald Parr, 150 Robertson Hollow Rd., Pulaski, TN (US) 38478

( * ) Notice: Subject to any disclaimer, the term of this patent is extended or adjusted under 35 U.S.C. 154(b) by 2 days.

(21) Appl. No.: 12/105,234

(22) Filed: Apr. 17, 2008

(65) Prior Publication Data

US 2008/0257837 A1   Oct. 23, 2008

Related U.S. Application Data

(60) Provisional application No. 60/923,883, filed on Apr. 18, 2007.

(51) Int. Cl.
*B01D 17/025* (2006.01)

(52) U.S. Cl. .......... 210/800; 210/803; 210/806; 210/241; 210/532.1; 210/538; 15/340.1; 15/353

(58) Field of Classification Search .......... 210/800, 210/803, 805, 806, 241, 532.1, 532.2, 538, 210/540; 15/340.1, 353
See application file for complete search history.

(56) References Cited

U.S. PATENT DOCUMENTS

| | | | | |
|---|---|---|---|---|
| 1,437,007 A | * | 11/1922 | Otterson | 210/241 |
| 4,525,277 A | * | 6/1985 | Poulin | 210/241 |
| 5,098,580 A | * | 3/1992 | Andersen | 210/803 |
| 5,536,418 A | * | 7/1996 | Foss | 210/800 |
| 5,637,233 A | * | 6/1997 | Earrusso | 210/241 |
| 5,720,885 A | * | 2/1998 | Moos | 210/803 |
| 6,110,383 A | * | 8/2000 | Coombs et al. | 210/241 |
| 6,379,547 B1 | * | 4/2002 | Larsson | 210/241 |
| 6,391,198 B1 | * | 5/2002 | Porter et al. | 210/241 |
| 6,790,368 B1 | * | 9/2004 | Vachon et al. | 210/803 |
| 7,037,436 B2 | * | 5/2006 | Use et al. | 210/803 |

* cited by examiner

*Primary Examiner*—Christopher Upton
(74) *Attorney, Agent, or Firm*—Pierchoski Law Firm; Stanley K. Pierchoski

(57) ABSTRACT

A process for decontamination and separation of a contaminated fluid including a first agent, a second agent, and a third agent may include the steps of directing the contaminated fluid to a first tank, substantially separating first agent in a first layer, a second agent in a second layer and a third agent in a third layer in a first tank, generating a vacuum and removing the first agent and the second agent by the vacuum, placing the first agent and the second agent in a second tank, generating a vacuum and removing the first agent and the second agent by the vacuum and placing the first and second agents in a second tank, removing the third agent by a vacuum and placing the third agent in a third tank, separating the first agent and the second agent based upon the gravities of the first and second agents, removing the second agent from the second tank and placing the second agent in the first tank based upon and until the first agent is detected.

13 Claims, 4 Drawing Sheets

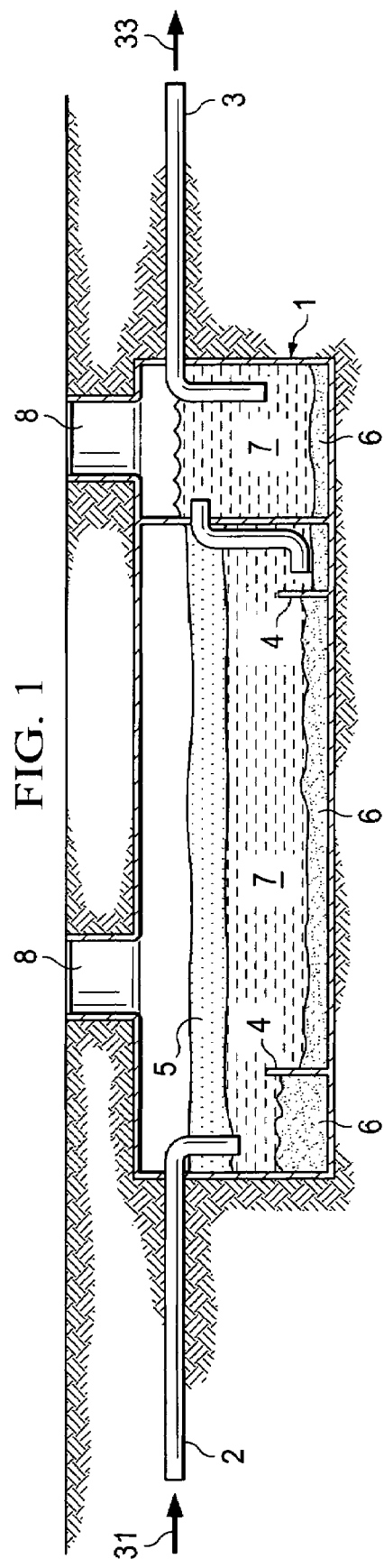
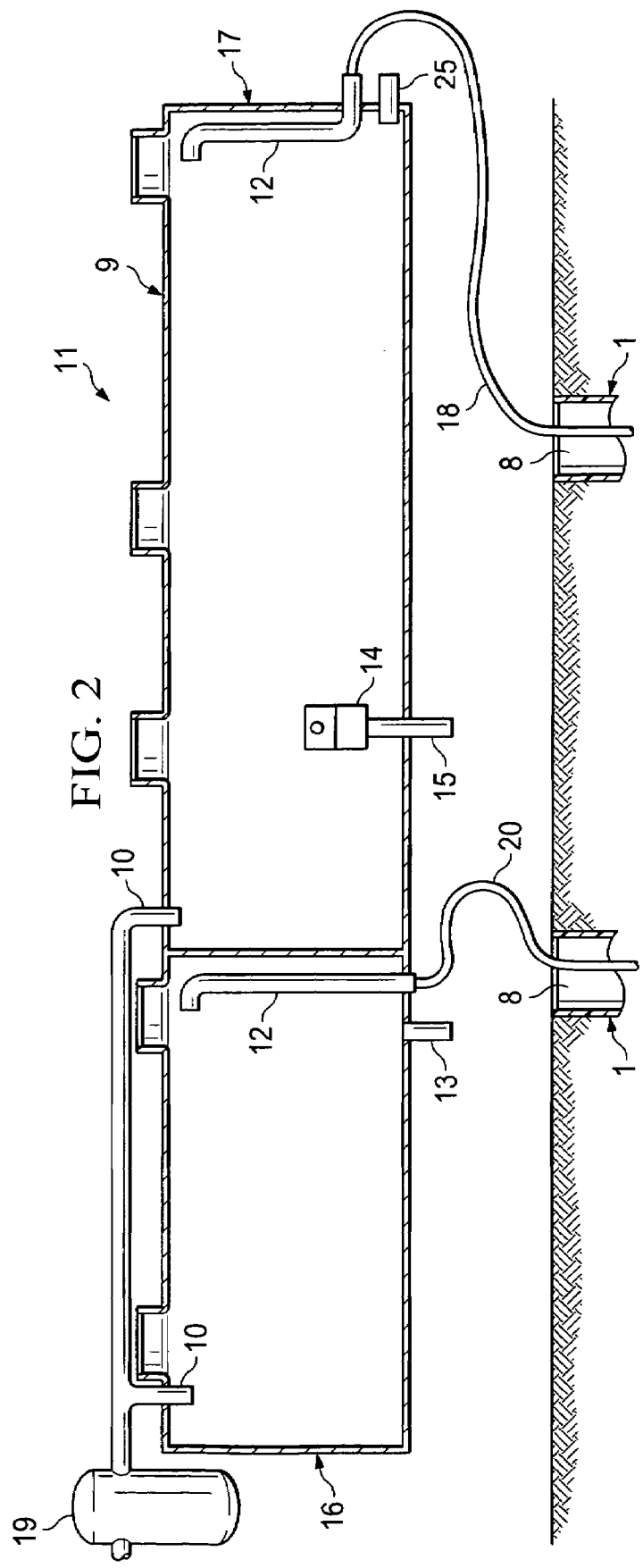
FIG. 1
FIG. 2

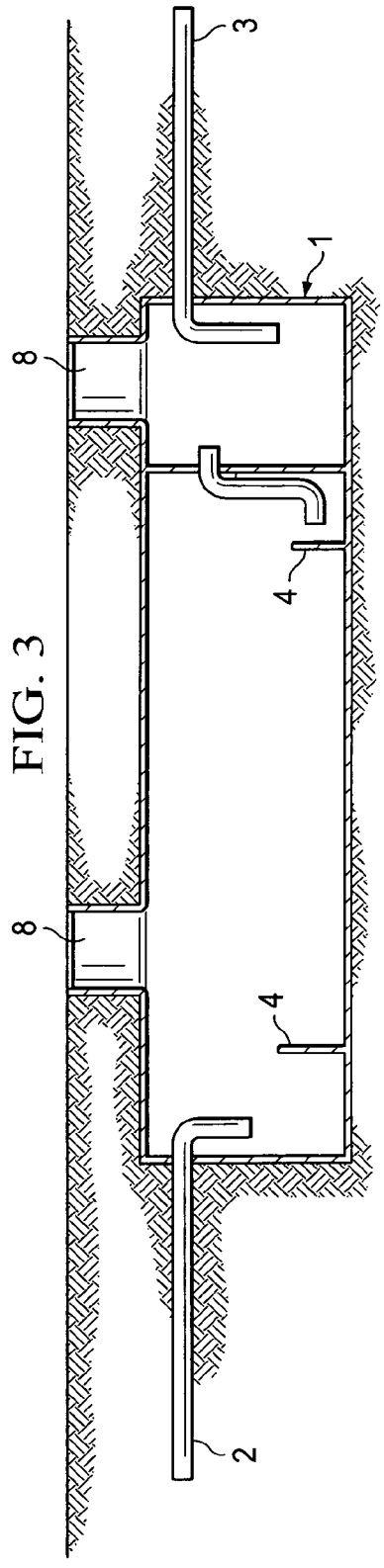
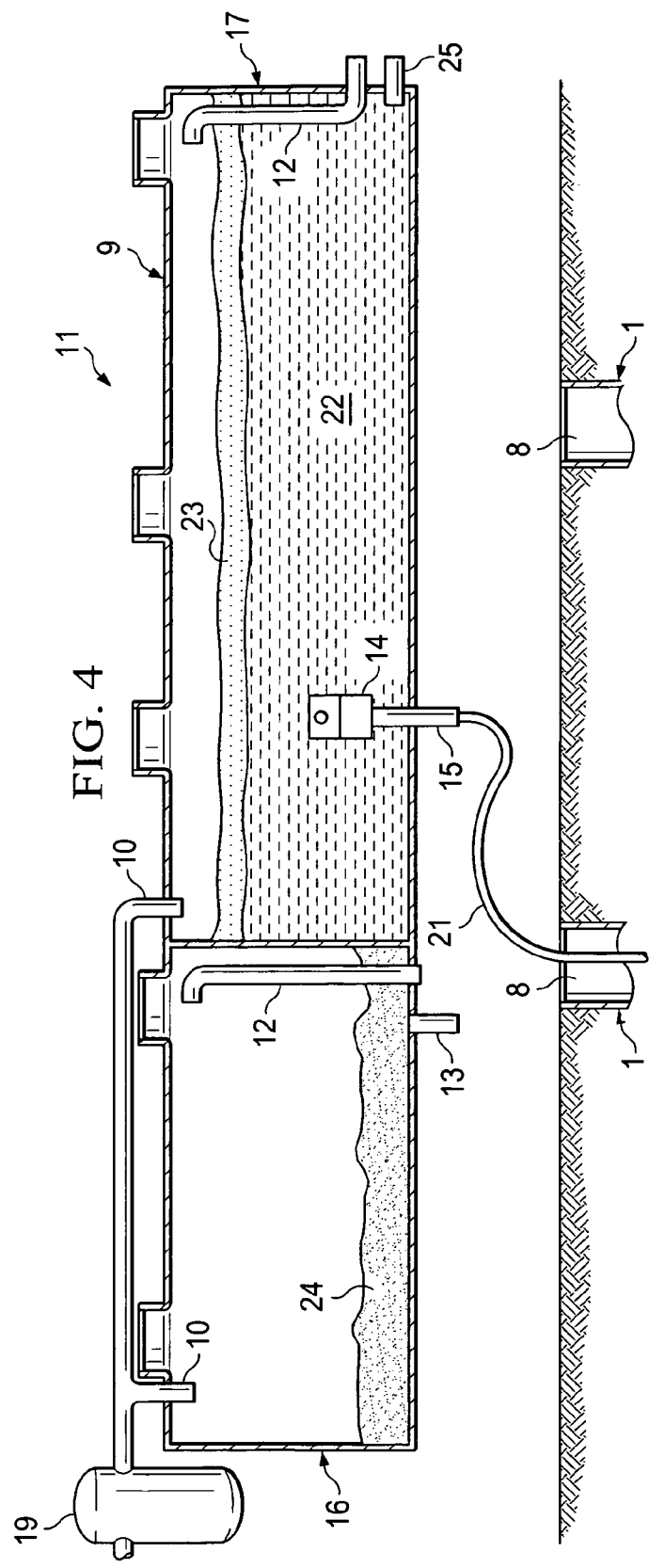

OIL/WATER SEPARATOR ONE TRUCK CLEANING WITH CLEAN WATER RETURN

PRIORITY

The present invention claims priority under 35 USC section 119 and is based upon the provisional application 60/923,883 which was filed on Apr. 18, 2007.

Attempts have been made in the prior art to control the level of the oil/water interface, for example see U.S. Pat. No. 5,147,534 (Rymal) and U.S. Pat. No. 4,031,007 (Sierra) and, more generally, see U.S. Pat. No. 4,960,513 (Young), U.S. Pat. No. 4,436,630 (Anderson) and U.S. Pat. No. 5,378,353 (Koch).

In all of these systems, whilst there has been a move away from a simple decant-type approach, there is usually added a specific oil from the water separation process beyond mere gravitational separation. Koch requires a specific separate coalescer unit whilst U.S. Pat. No. 4,554,074 (Broughton) utilizes separation plates.

Most commercial industry that deals with vehicles such as automotive, tractor, diesel engine service and that deals with the repair of these vehicles, or any industry having to deal with any type or grade oil, generates and accumulates waste oil either by accident or design that is washed from the surfaces of the service areas with water and is routed to a waste tank, which is typically referred to as an oil-water separator tank or other appropriate name. Regardless of the type of oil or general fluid employed the contents of the waste tank may stratify into at least three basic layers; an oil layer that floats to the top due to a lower specific gravity of the remaining two layers; a water layer that settles below the oil layer due to a higher specific gravity and above the third layer; and a sludge layer or third layer that includes particulate matter that settles to the bottom of the tank with a specific gravity higher than either the oil or water.

Environmental guidelines will allow the discharge of the water but the oil and sludge (liquid-waste) are typically removed from the tank and disposed of elsewhere in permitted facilities. In the past, cleaning of the tank usually required the removal and disposal of the entire contents of the tank; i.e.: the oil, water and sludge. However, the majority of the volume of a tank is the layer of water which could be discharged without removal and disposal at a permitted facility. Typically, such tanks were cleaned by mobile tanker trucks that transfer the entire contents of the tank, oil, water, and sludge to the mobile tanker truck, which then disposes the entire contents of the mobile tanker truck which includes the oil, water and sludge at a permitted facility. These mobile trucks are limited in the number of tanks with which can be serviced without being emptied at the permitted facility. Due to the large volumes involved, a typical mobile tanker truck can accommodate very few separator tanks before it is full. The bulk of the contents of the truck tanks may be water. Any process used transfers the entire contents of the oil water separator tank into a single compartment truck tank, allows time for the materials to stratify and returns the water to the oil water separator tank. This process requires additional time and sometime the addition of coagulants to speed up the stratification process.

SUMMARY

A process for decontamination and separation of a contaminated fluid including a first agent, a second agent, and a third agent may include the steps of directing the contaminated fluid to a first tank, substantially separating first agent in a first layer, a second agent in a second layer and a third agent in a third layer in a first tank, generating a vacuum and removing the first agent and the second agent by the vacuum, placing the first agent and the second agent in a second tank, removing the third agent by a vacuum and placing the third agent in a third tank, separating the first agent and the second agent based upon the gravities of the first and second agents, removing the second agent from the second tank and placing the second agent in the first tank based upon and until the first agent is detected.

The first agent may be oil, the second agent may be water and the third agent may be sludge.

The first tank may be a oil/water separation tank, and the second tank may be mounted on a vehicle.

The vehicle may be a truck or trailer.

BRIEF DESCRIPTION OF THE DRAWINGS

The invention may be understood by reference to the following description taken in conjunction with the accompanying drawings, in which, like reference numerals identify like elements, and in which:

FIG. 1 is a side cross-sectional view of an oil-water separator tank before cleaning;

FIG. 2 is a side cross-sectional view of an Oil-Water Separator One Truck Cleaning with Clean Water Return truck prior to cleaning;

FIG. 3 is a side cross-sectional view of an oil-water separator tank after its contents have been removed;

FIG. 4 is a side cross-sectional view of an Oil-Water Separator One Truck Cleaning with Clean Water Return truck after the contents of the tank have been removed;

DETAILED DESCRIPTION

Figure 5:
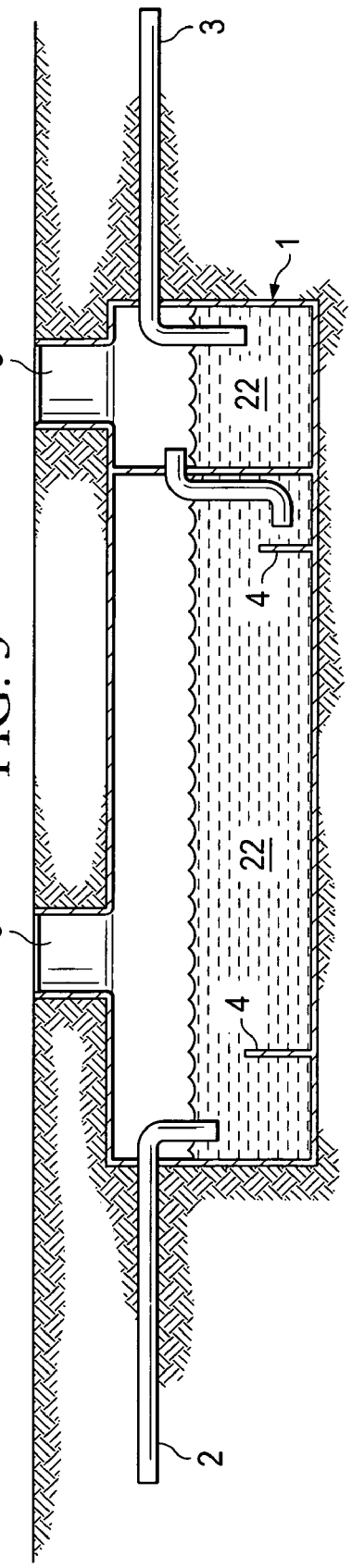
FIG. 5 is a side cross-sectional view of an oil-water separator tank after completion of the Oil-Water Separator with Clean Water Return process.

This invention, Oil/Water Separator One Truck Cleaning with Clean Water Return is a process that empties substantially the entire contents of the oil-water separator tank into a mobile tanker truck then returns only the water to the same original tank. The process allows a single mobile tanker truck to service many more oil-water separator tanks before it must dispose of its contents, making the process timelier and more cost efficient to the owner of the oil-water separator tank which requires cleaning.

The Oil-Water Separator One Truck Cleaning with Clean Water Return is a process that cleans commercial oil-water separator tanks at reduced cost to the tank owner by removing substantially only the oil and sludge layers. The volume of water in the tank is removed and then returned as clean water, substantially reducing the volume requiring special permitted disposal facilities.

FIG. 1 illustrates that an oil-water separation tank 1 as a first tank (herein after "OWS Tank) is buried underground and illustrates that the tank 1 is shown as being substantially a rectangular housing which is formed from rigid material. The tank 1 may be oval, circular or any other suitable shape, and the tank 1 may be partially underground or aboveground. The oil/water separation tank 1 receives a contaminated fluid 31 which includes multiple agents which may include, oil as a first agent, water as a second agent and sludge as a third agent from an in pipe 2, and additional agents may be employed. The oil/water separation tank 1 may discharge substantially clean water 7 by the out pipe 3. The oil/water separation tank 1 may include internal vertical partitions or baffles 4 rising from the bottom of the housing to allow the oil 5 to float to the top of the contaminated fluid 31 and sludge 6 to settle to the bottom of the separation tank 1 and water 7 to settle in between the oil 5 and sludge 6. An access door 8 which extends from the top of the separation tank 1 to at or above the ground level or multiple access doors 8 are located on top of the tank 1 for cleaning and access to the tank 1. Such tanks 1 allow the oil 5, water 7 and sludge 6 to separate based upon their specific gravities. Once the oil 5 and sludge 6 is separated from the water 7, the substantially clean water 5 is allowed to leave the tank through the out pipe 3. The OWS Tank 1 should be periodically removed of oil 5 and sludge 6 to maintain high quality discharge water 5.

The Oil-Water Separator One Truck Cleaning with Clean Water Return process utilizes a vehicle 9 such as a truck or trailer-mounted or otherwise mobile dual compartment tank to remove the oil 5 and sludge 6 in order to maintain discharge water quality of the oil-water separator tank 1. The vehicle 9 which may include a single compartment 11 or multiple compartments with each compartment 11 on the vehicle 9 includes a vacuum pipe 10 which is connected to a vacuum source 19 which may be a vacuum pump and is connected to the sludge tank 16 (which may be a compartment) as a third tank and the oil tank 17 as the second tank, a fill pipe 12 to remove contaminated fluid 31 including the oil 5, sludge 6 and water 7 from the tank 1. FIG. 2 discloses a dump valve 13 to drain the sludge tank 16 of the compartment 11 of the sludge 6 into a permitted disposal facility. A portion of the compartment 11 of the vehicle 9 is a sludge tank 16 to store the sludge 6, and another portion of the compartment 11 is an oil tank 17 (which may be a compartment). The oil tank 17 is connected to an oil-stop valve assembly 14 and a water dump valve (15). The oil dump valve 25 is used to drain the oil 6 from oil tank 17 into a permitted facility. The second tank could have a first compartment and a second compartment or more.

One end of a flexible hose 18 which may be crush proof is attached to the oil tank 17 at the bottom of the fill pipe 12, and the opposing end is inserted into the contaminated fluid 31 including the oil 5 and water 7 stored in the tank 1 by placing the end of the flexible hose 18 through an access door 8. The vacuum source 19 generates a vacuum through the vacuum line 10 which is connected to the oil tank 17 which in turn generates a vacuum through the flexible hose 18 to pull the oil 5 and water 7 in the tank 1 through the flexible hose 18 into the oil tank 17. The oil 5 and water 7 are removed through the flexible hose 18 and into the oil tank 17 until the sludge 6 remains and is exposed within the tank 1. Once substantially all of the oil 5 and the water 7 from the tank 1 is transferred to the oil tank 17, the oil 5 and water 7 quickly separate back into separate into two distinct layers as a result of their differing specific gravities. One end of a second flexible hose 20 which may be crush proof is attached to the sludge tank 16 at the bottom of the fill pipe 12, and the other opposing end of the second flexible hose 20 is inserted into the sludge 6 of the tank 1 by inserting the second flexible hose 20 through the access door 8. The vacuum source 19 creates a vacuum through the vacuum pipe 10 which is connected to the sludge tank 16 which in turn creates a vacuum through the second flexible hose 20 which is inserted into the sludge 6 of the tank 1. As a result, the sludge 6 is drawn through the second flexible hose 20 and into the sludge tank 16.

A vacuum is drawn on the sludge tank by a vacuum pump 19 through vacuum pipe 10 causing the sludge 6 in the tank 1 to be transferred to the sludge tank 16. At this point, the tank 1 is substantially empty of contaminated fluid including the oil 5, the sludge 6 and the water 7, and the vacuum is discontinued. One end of a discharge hose 21 is connected to the water dump valve 15 positioned on the oil tank 17, and the opposing end of the discharge hose 21 is inserted into the tank 1 through the access door 8. FIG. 4 illustrates the sludge 24 within the sludge tank 16.

An oil-stop valve assembly 14 senses and closes when most of the water has been discharged by a ball of the oil-stop valve assembly 14 that floats in water and sinks in oil. Consequently, the oil-stop valve assembly 14 is open when it is immersed in water and closed when it is partially immersed in oil. FIG. 4 illustrates the separated water layer 22 in the oil tank 17 to be drained back to the tank 1 by gravity until the separated oil layer 23 in the oil tank 17 reaches the level of the oil-stop valve assembly 14 which causes a float-ball in the oil-stop valve assembly 14 or other device to detect the oil surface of the oil layer 23 to sink and close.

FIG. 5 illustrates the oil-water separator tank 1 in which the separated water 22 as illustrated in FIG. 4 has been returned to the tank 1.

When the water stops flowing, the water dump valve 15 is closed by manual or automatic devices.

Figure 6:
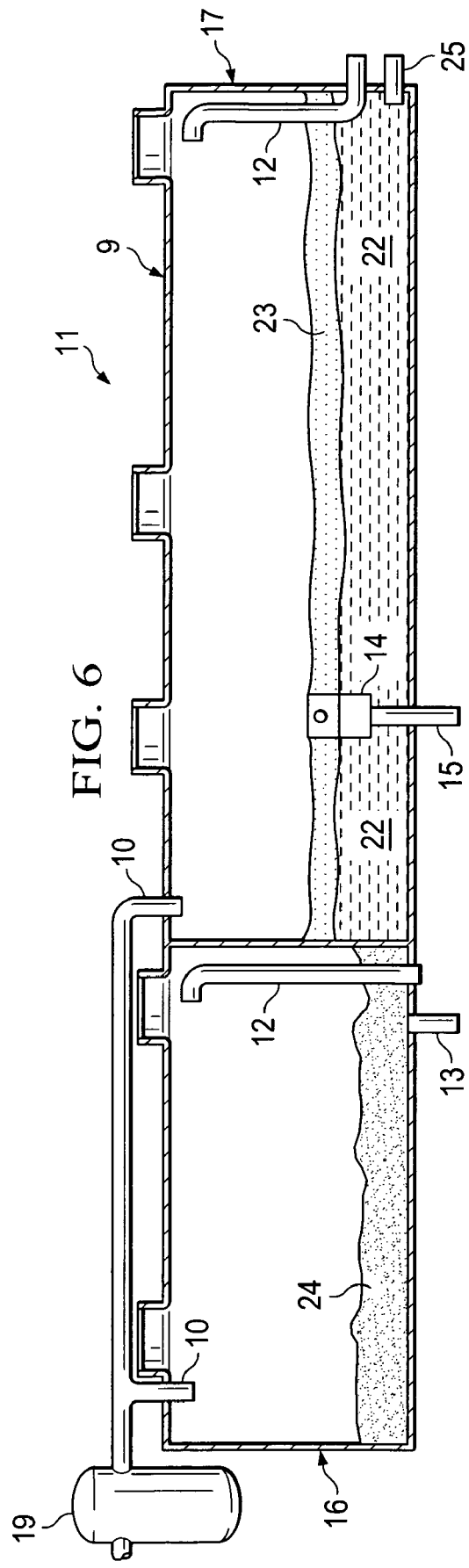
FIG. 6 is a side cross-sectional view of an Oil-Water Separator One Truck Cleaning with Clean Water Return truck after completion of the Oil-Water Separator with Clean Water Return process.

FIG. 6 illustrates the sludge tank 16 which contains sludge 24 and the oil tank 17 which includes oil 23 which has reached a level of the oil stop valve assembly 14.

The OWS Tank 1 now contains clean water 22, and the oil 23 and the sludge 24 remain in the vehicle 9 for proper disposal.

Figure 7:
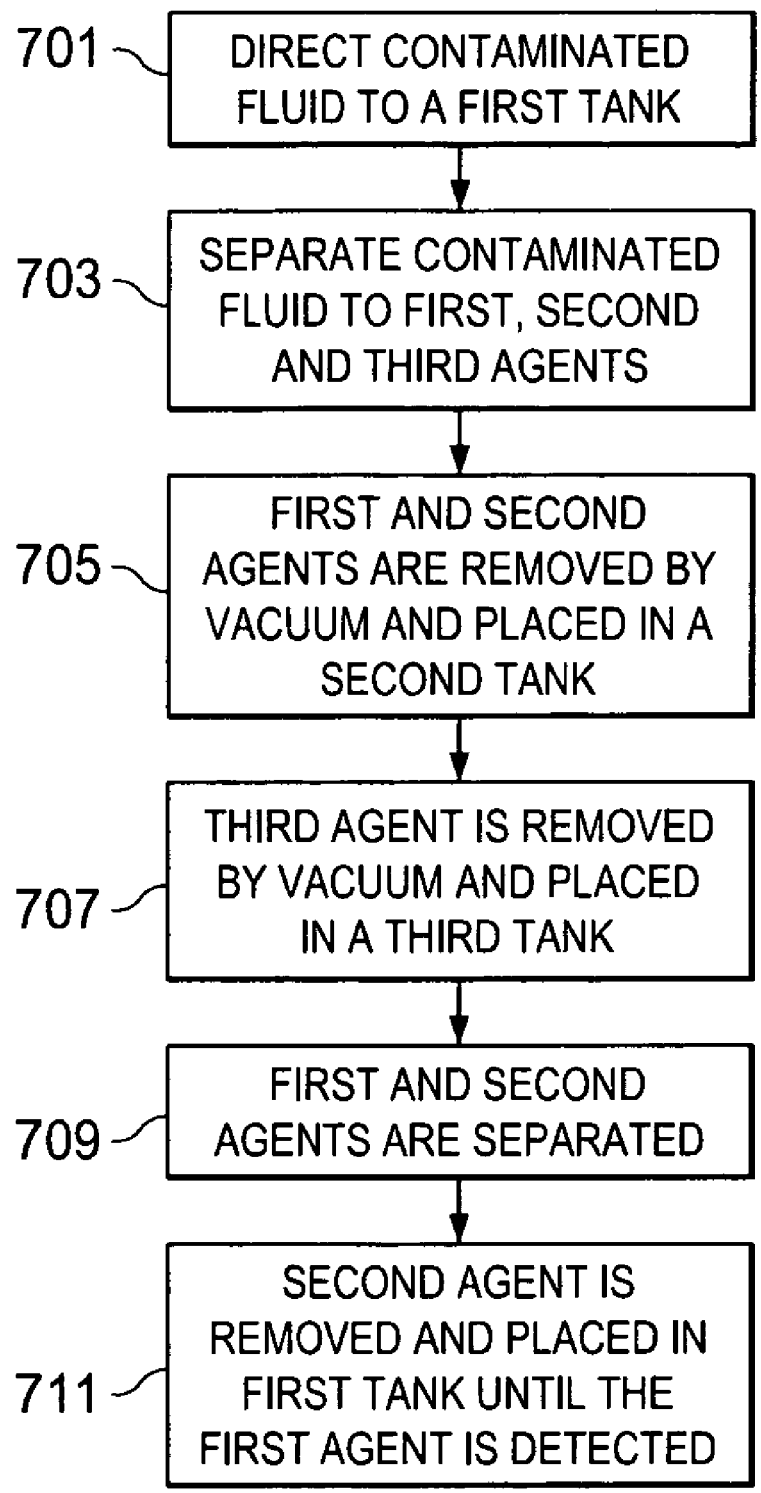
FIG. 7 illustrates a flow chart of the process of the present invention.

A process for decontamination and separation of a contaminated fluid is illustrated in FIG. 7. In step 701, contaminated fluid is directed to a first tank. The contaminated fluid includes the first agent, the second agent, and the third agent which may be oil, water and sludge. In step 703, the contaminated fluid is separated to substantially a separated first agent in a first layer, a separated second agent in a second layer and a separated third agent in a third layer. In step 705, a mobile vehicle generates a vacuum and removes the first agent and the second agent by the vacuum and places the first and second agents in a second tank. In step 707, the mobile vehicle generates a vacuum and removes the third agent and places the third agent in a third tank.

In step 709, the first and second agents are separated based upon the specific gravities of the first and second agents. In step 711, the second agent is removed from the second tank and placed in the first tank based upon and until the first agent is detected.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A process for decontamination and separation of a contaminated fluid including a first agent, a second agent, and a third agent, comprising the steps of:
   directing the contaminated fluid to a first tank;
   substantially separating the first agent in a first layer, the second agent in a second layer and the third agent in a third layer in a first tank;
   generating a vacuum and removing the first agent and the second agent by the vacuum;

placing the first agent and the second agent in a second tank;

removing the third agent by a vacuum and placing the third agent in a third tank;

separating the first agent and the second agent based upon the gravities of the first and second agents;

removing the second agent from the second tank and placing the second agent in the first tank based upon and until the first agent is detected.

2. A process for decontamination and separation of a contaminated fluid including a first agent, a second agent, and a third agent as in claim 1, wherein the first agent is oil.

3. A process for decontamination and separation of a contaminated fluid including a first agent, a second agent, and a third agent as in claim 1, wherein the second agent is water.

4. A process for decontamination and separation of a contaminated fluid including a first agent, a second agent, and a third agent as in claim 1, wherein the third agent is sludge.

5. A process for decontamination and separation of a contaminated fluid including a first agent, a second agent, and a third agent as in claim 1, wherein the first tank is a oil/water separation tank.

6. A process for decontamination and separation of a contaminated fluid including a first agent, a second agent, and a third agent as in claim 1, wherein the second tank is mounted on a vehicle.

7. A process for decontamination and separation of a contaminated fluid including a first agent, a second agent, and a third agent as in claim 6, wherein the vehicle is a truck.

8. A process for decontamination and separation of a contaminated fluid including a first agent, a second agent, and a third agent as in claim 6, wherein the vehicle is a trailer.

9. A process for decontamination and separation of a contaminated fluid including a first agent, a second agent, and a third agent as in claim 1, wherein the third tank is mounted on a vehicle.

10. A process for decontamination and separation of a contaminated fluid including a first agent, a second agent, and a third agent as in claim 9, wherein the vehicle is a truck.

11. A process for decontamination and separation of a contaminated fluid including a first agent, a second agent, and a third agent as in claim 9, wherein the vehicle is a trailer.

12. A process for decontamination and separation of a contaminated fluid including a first agent, a second agent, and a third agent as in claim 1, wherein the first agent is oil, the second agent is water and the third agent is sludge.

13. A process for decontamination and separation of a contaminated fluid including a first anent, a second agent, and a third agent as in claim 1, wherein the second tank includes at least 2 compartments.

* * * * *